US 6,741,869 B1

United States Patent
Lehr

(10) Patent No.: US 6,741,869 B1
(45) Date of Patent: May 25, 2004

(54) RADIO-LIKE APPLIANCE FOR RECEIVING INFORMATION FROM THE INTERNET

(75) Inventor: Ted Lehr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/989,499

(22) Filed: Dec. 12, 1997

(51) Int. Cl.[7] .............................. H04B 1/38; H04M 1/00
(52) U.S. Cl. ................... 455/557; 455/414.1; 455/90.1; 455/344
(58) Field of Search .......................... 455/6.3, 5.1, 4.2, 455/466, 426, 550; 379/101.01; 370/352, 338, 401, 355, 356; 348/12, 13, 7; 345/327; 709/219

(56) References Cited

U.S. PATENT DOCUMENTS

| | | | | |
|---|---|---|---|---|
| 5,537,141 A | * | 7/1996 | Harper et al. .................. 348/12 |
| 5,616,876 A | * | 4/1997 | Cluts ............................ 84/609 |
| 5,623,690 A | * | 4/1997 | Palmer et al. ............... 395/806 |
| 5,721,951 A | * | 2/1998 | DorEl .......................... 395/930 |
| 5,726,909 A | * | 3/1998 | Krikorian ................ 364/514 R |
| 5,727,002 A | * | 3/1998 | Miller et al. ................... 371/32 |
| 5,734,119 A | * | 3/1998 | France et al. ................. 84/622 |
| 5,751,338 A | * | 5/1998 | Lugwig, Jr. ................... 379/94 |
| 5,753,844 A | * | 5/1998 | Matsumoto ................... 84/609 |
| 5,774,859 A | * | 6/1998 | Houser et al. ............... 704/275 |
| 5,787,259 A | * | 7/1998 | Haroun et al. ........... 379/93.01 |
| 5,799,063 A | * | 8/1998 | Krane .......................... 379/67 |
| 5,883,957 A | * | 3/1999 | Moline et al. ................. 380/4 |
| 5,905,719 A | * | 5/1999 | Arnold et al. ............... 370/330 |
| 5,926,789 A | * | 7/1999 | Barbara et al. ............. 704/275 |
| 5,937,041 A | * | 8/1999 | Cardillo, IV et al. | |
| 5,949,643 A | * | 9/1999 | Batio .......................... 361/681 |
| 5,961,603 A | * | 10/1999 | Kunkel et al. ............... 709/299 |
| 5,983,073 A | * | 11/1999 | Ditzik | |
| 5,987,029 A | * | 11/1999 | Kotani et al. ................ 370/389 |
| 6,005,603 A | * | 12/1999 | Flavin .......................... 455/5.1 |
| 6,009,469 A | * | 12/1999 | Mattaway et al. .......... 709/227 |
| 6,012,086 A | * | 1/2000 | Lowell ........................ 709/218 |
| 6,014,569 A | * | 1/2000 | Bottum ....................... 455/466 |
| 6,041,359 A | * | 3/2000 | Birdwell ..................... 709/238 |
| 6,097,383 A | * | 8/2000 | Gaughan et al. ............ 345/327 |
| 6,389,463 B2 | * | 5/2002 | Bolas et al. ................. 709/219 |

OTHER PUBLICATIONS

Katz, NA, *Personal Digital Radio Service*, 8/95, pp. 315–316.

Naughton, R., *A Future in Radio?—A Radio for the Future?*, http://www.cinemedia.com.au, 1995–1996, pp. 1–19.

Boykin, Jr, *Musical Instrument Digital Interface Auditioner*, 12/93, pp. 87–90.

* cited by examiner

Primary Examiner—Charles Craver
(74) Attorney, Agent, or Firm—Duke W. Yee; Jeffrey S. LaBaw; Stephen J. Walder, Jr.

(57) ABSTRACT

An internet radio provides receiving and playing audio data originating from an internet. The internet radio includes controls suitable for manipulation by human digits, a communications unit used to provide the radio a communications link to the internet, an audio unit, and a processor. The processor is electrically connected to the controls, the communications unit, and the audio unit. The processor includes first instruction means for establishing the communications link to the internet using the communications unit, second instruction means for accessing an internet site containing audio data in response to a manipulation of a first control within the controls, and third instruction means for playing the audio data through the audio unit.

22 Claims, 12 Drawing Sheets

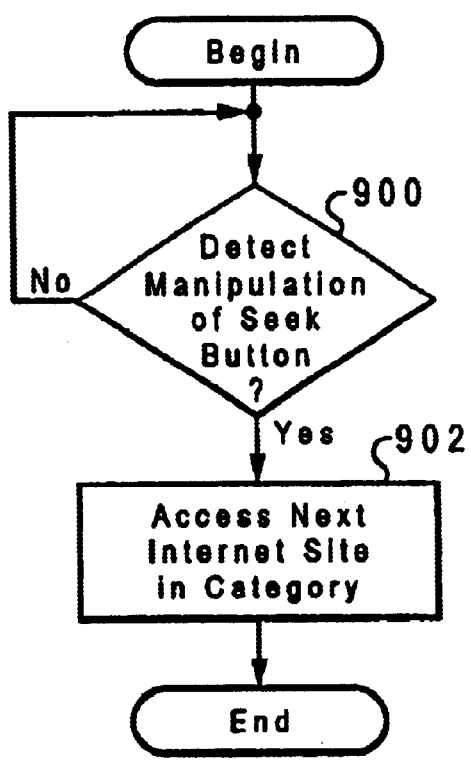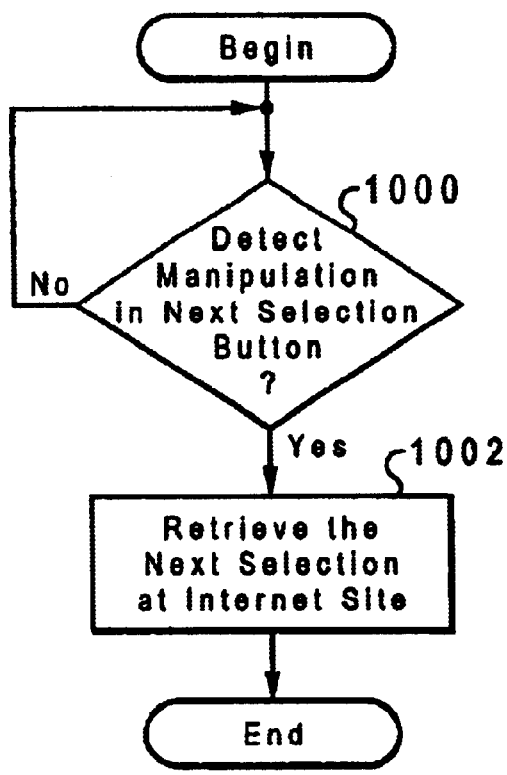
Fig. 9
Fig. 10

RADIO-LIKE APPLIANCE FOR RECEIVING INFORMATION FROM THE INTERNET

BACKGROUND OF THE INVENTION

1. Technical Field

The present invention relates to an improved data processing system, and in particular to an improved apparatus for accessing audio data. Still more particularly, the present invention relates to an apparatus for accessing audio data from a remote source within a distributed data processing system.

2. Description of the Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

The largest segment of the consuming public does not currently have access to these resources. Such consumers are typically either unable or unmotivated to acquire both the requisite hardware and software and the necessary computer skills for taking advantage of these resources. As a result, the Internet is not accessed by many households and businesses because of the high entry cost and inexperience by many consumers in using computers. Consequently, a need exist for low cost data processing systems, which are simple to operate, allowing users without computer skills the opportunity to access the Internet.

Additionally, access to the Internet also is frustrated by slowed data rate provided by modems for analog telephone lines. These slow data rates limit the entertainment uses of the Internet to download and use actions instead of real time interactions.

Many telephone and cable television companies, however, are expected to provide high speed integrated services digital network (ISDN), T1, or other digital connections to households. These high speed communications links provide an ability to deliver real time video and audio over the Internet.

Various Internet sites offer various audio and video services. For example, some sites offer audio versions of television and radio news programs while other sights offer music, weather, or sports services. These services are typically accessible and entertaining only for persons who use state of the art personal computers or workstations and are connected to the Internet.

The largest segment of the consuming public does not currently have access to these resources. Such consumers are typically either unable or unmotivated to acquire both the requisite hardware and software and the necessary computer skills for taking advantage of these resources. A need exists for low cost data processing systems which are simple to operate, allowing users without computer skills the opportunity to access the Internet. This need is being addressed, to some extent, by "set-top-box" systems.

In designing however, it is necessary to presume that the target user is unsophisticated and/or inexperienced. In particular, it would be advantageous to have a data processing system that provides a consumer access to the Internet through a low cost, simple data processing system that is both simple and intuitive, requiring little or no technical sophistication on the part of the user.

SUMMARY OF THE INVENTION

It is one object of the present invention to provide an improved data processing system;

It is another object of the present invention to provide an improved apparatus for accessing audio data; and It is yet another object of the present invention relates to an apparatus for accessing audio data from a remote source within a distributed data processing system.

The foregoing objects are achieved as is now described.

The present invention provides an internet radio for receiving and playing audio data originating from an internet. The internet radio includes controls suitable for manipulation by human digits, a communications unit used to provide the radio a communications link to the internet, an audio unit, and a processor. The processor is electrically connected to the controls, the communications unit, and the audio unit. The processor includes first instruction means for establishing the communications link to the internet using the communications unit, second instruction means for accessing an internet site containing audio data in response to a manipulation of a first control within the controls, and third instruction means for playing the audio data through the audio unit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a flowchart of a process for accessing internet sites in accordance with a preferred embodiment of the present invention.

FIG. 10 is a flowchart of a process for choosing selections in an internet site in accordance with a preferred embodiment of the present invention.

DETAILED DESCRIPTION OF PREFERRED EMBODIMENT

Figure 1:
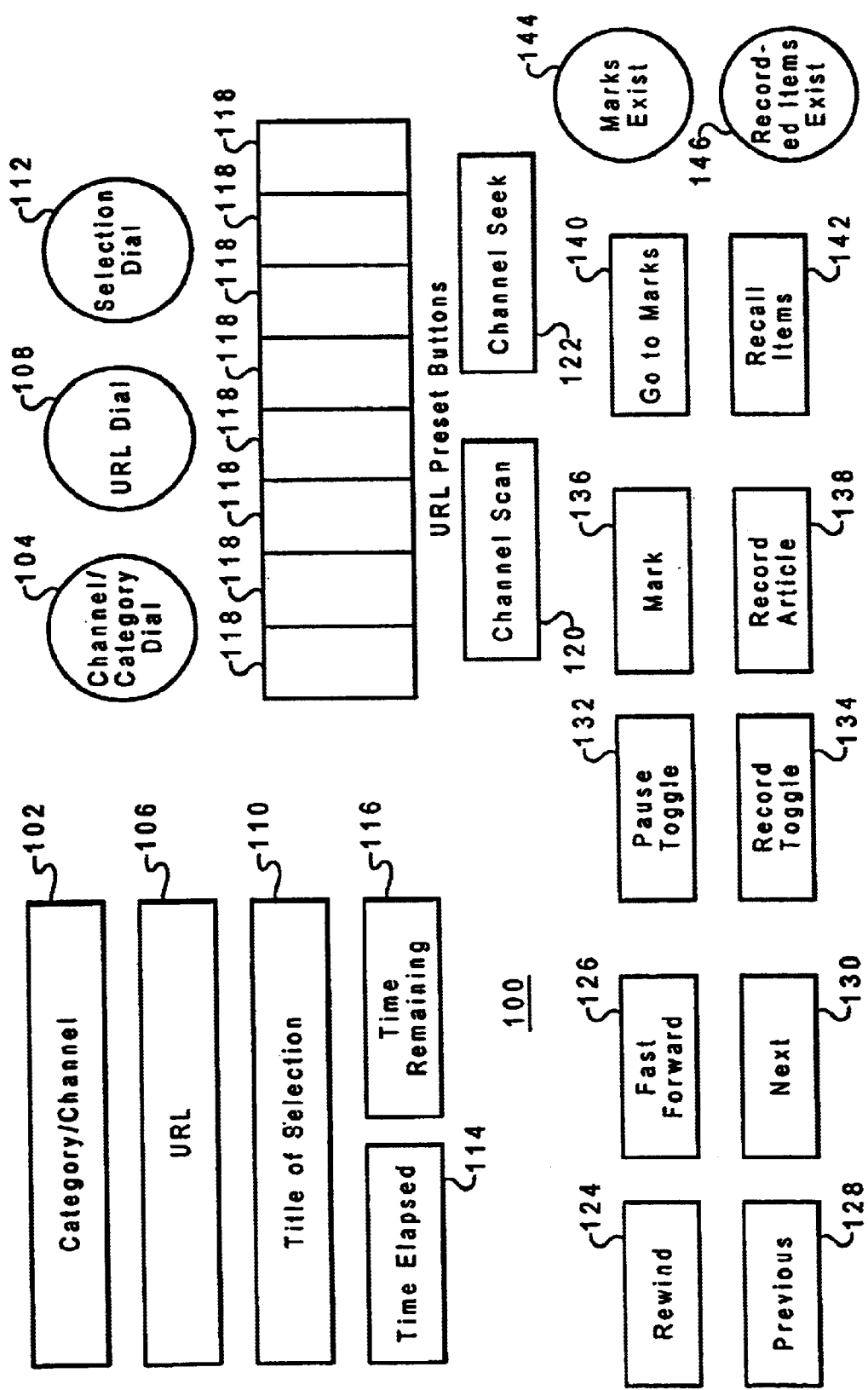
FIG. 1 is a diagram of a panel in a Internet radio in accordance with a preferred embodiment with the present invention.

The present invention provides an appliance in the form of an "internet radio" with a user interface modeled after that of a traditional AM/FM radio. This interface provides controls that are analogous to those on a counter top radio. Through this "internet radio", a user may access audio services from the internet. For example, a user may access audio versions of radio and news programs as well as music, weather, or sports services. With reference now to the figures, and in particular with reference to FIG. 1, a diagram of a panel in an internet radio is depicted in accordance with a preferred embodiment with the present invention. The internet radio includes a number of physical controls designed for manipulation by human digits in the form of dials and buttons.

Panel 100 contains an output panel 102, which displays a category or channel to a user. For example, categories, such as news, sports, or music, may be displayed on output panel 102. Dial 104 is used to select one of a number of predefined categories, which are displayed on output panel 102. Output panel 106 displays the URL name, a path, or "nickname", which are selected using URL dial 108. The URL is selected from a group within a category, which is identified on output panel 102. Output panel 110 displays a title of a selection that is being played to the user. Selection dial 112 is employed to select an item in a URL with that selection being displayed on output panel 110.

Output panel 114 displays the elapsed time for the current selection while output panel 116 displays the remaining time present for the current selection.

"Preset" buttons 118 are employed for going directly to a URL or a URL based content, similar to a bookmark in an internet browser program. "Channel Scan" button 120 is employed to scan URLs within a category or channel. As different URLs are being scanned, those URLs will be displayed in output panel 106. When in a scan mode, the internet radio will stay on a URL for a preselected amount of time before moving to the next URL in the channel. This scanning continues until "Channel Scan" button 120 is again depressed by the user. "Channel Seek" button 122 causes the channel to move to the next URL in its list each time "Channel Seek" button 122 is depressed. "Rewind" button 124 is used to rewind the selection to the beginning or until rewind 124 is again selected. "Fast Forward" button 126 is employed to fast forward the selection until its end or until "Fast Forward" button 126 is again selected. "Previous" button 128 is used to move to a previously selected item, and "Next" button 130 is used to move to the next item to be selected for playback to the user. "Pause" button 132 is used to pause the current selection until this button is again pressed. "Record" button 134 is used to record a selection that is currently being played. "Mark" button 136 is used to mark a current selection so that it can be again accessed at a later point in time. "Record Article" button 138 is employed to record entire selections. "Go To Marks" button 140 is used to go to marked selections. When multiple selections have been marked, this button may be employed to cycle through the various selections. "Recall Items" button 142 are used to recall selections that have been recorded. If multiple selections exists, "Recall Items" button 142 is employed to cycle through the selections. Indicator 144 indicates whether marked selections exists. Indicator 146 is employed to indicate whether selection have been recorded.

Figure 2:
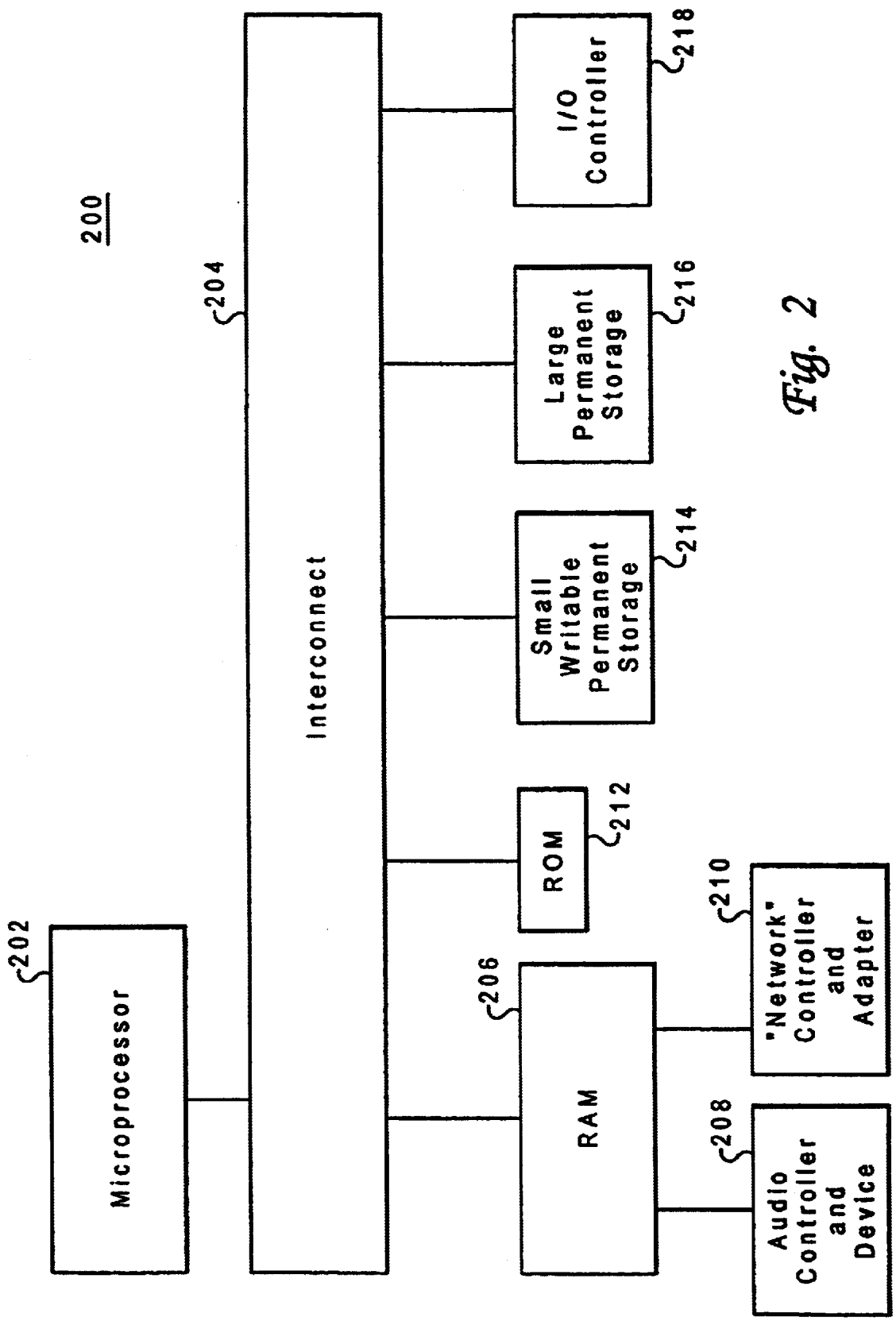
FIG. 2 is a block diagram of components within an internet radio in accordance with the preferred embodiment of the present invention.

Turning next to FIG. 2, a block diagram of components within an internet radio is depicted in accordance with the preferred embodiment of the present invention. Internet radio 200: contains a micro-processor 202, which is coupled to interconnect 204. In the depicted example, interconnect 204 is a bus, but other kinds of interconnects, such as point to point interconnect may be employed. Random access memory (RAM) 206 is coupled to interconnect 204 and provides a memory to store data. In the depicted example, RAM 206 is 8 megabytes in size. Internet radio 200 also includes a audio controller and device 208, which is connected to RAM 206. In the depicted example, audio controller and device 208 is a direct memory access (DMA) audio controller and device. The audio device portion of audio controller and device 208 may consist of a single speaker, a number of speakers, or may include outputs to connection to speakers. Network controller and adapter 210 also is connected to RAM 206. This device provides a connection to the internet to receive programs that are to be played on Internet radio 200. Network controller and adapter 210 may take the form of a modem adapted for connection to a phone line in a public switch telephone network.

Read only memory (ROM) 212 contains boot up software for the operating system in the depicted example. Small writable permanent storage 214 is employed to store user settings. This component is optional and is typically present if the radio is to have its power turned off and no lower power mode exist. Large permanent storage 216 is used to save articles selected to be recorded by the user. A storage may be, for example, in the form of a disk drive, permanent RAM, or an optical disk. Additionally, large permanent storage 216 may be part of RAM 206 if the radio does not guarantee of permanence of saved selections across power outages. Input/Output (I/O) controller 218 is employed to interrupts from panel 100 to microprocessor 202. In some cases, I/O controller may be connected to microprocessor through an I/O bus. Program information containing URLs for internet sites and selections within internet sites may be stored within large permanent storage 216 in the depicted example.

Figure 3:
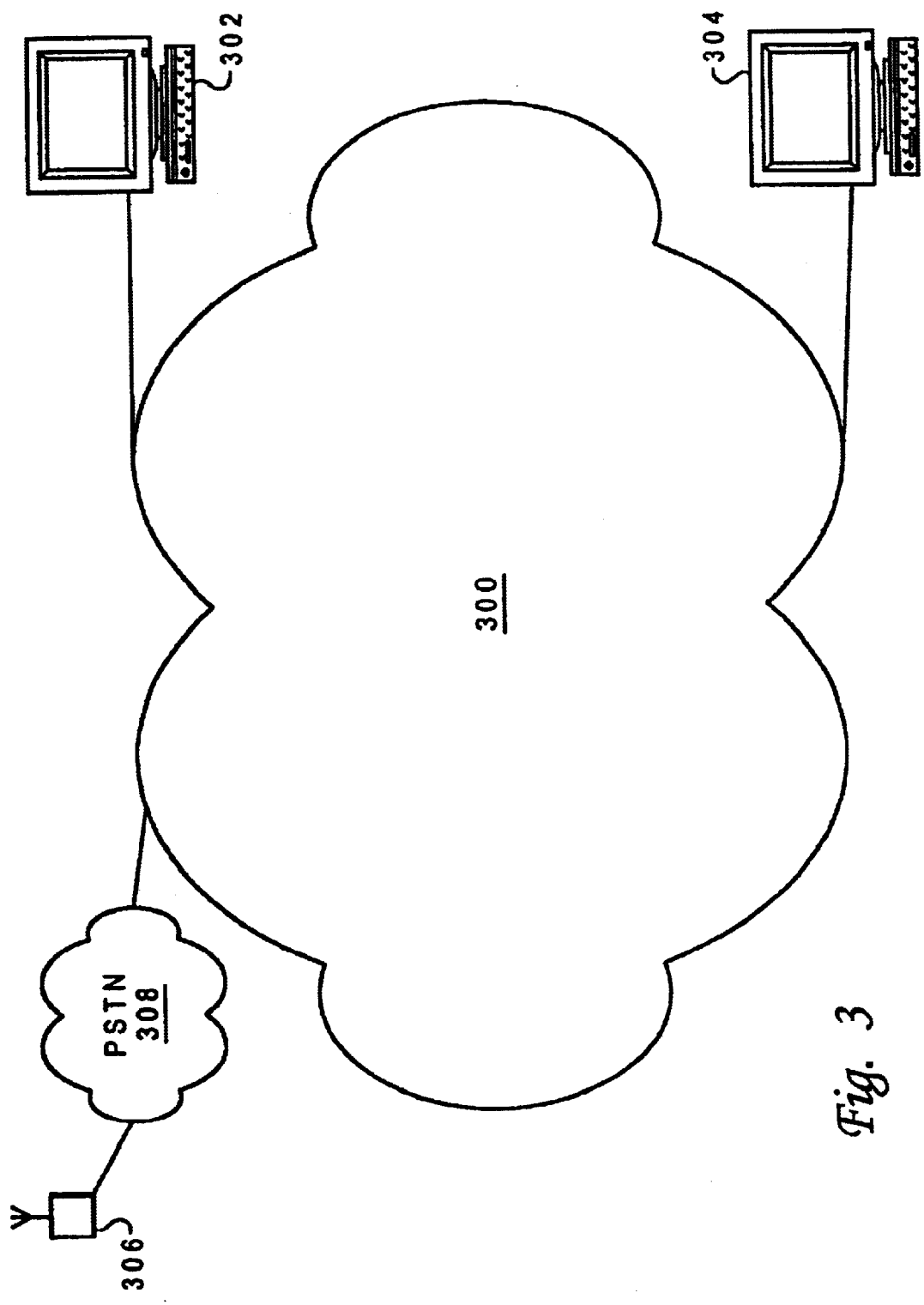
FIG. 3 is a diagram of a network in which the present invention may be implemented.

Turning now to FIG. 3, a diagram of a network is illustrated in which the present invention may be implemented. In the depicted example, network 300 is the internet, which is a world wide network of public and private computer networks that link businesses, universities, government agencies, and other different computer systems in networks by means of a common telecommunications standard. Data processing system 302 and data processing system 304 are connected to network 300.

Internet radio 306 is communication with network 300 through its connection to public switch telephone network 308. In the depicted example, data processing systems 302 and 304 are sources of programming for internet radio 306. Additionally, one of these data processing systems also may contain URL information that may be downloaded to internet radio 306 to identify internet sites containing audio data. Alternatively, URL information may be directly programmed into internet radio 306.

Figure 4:
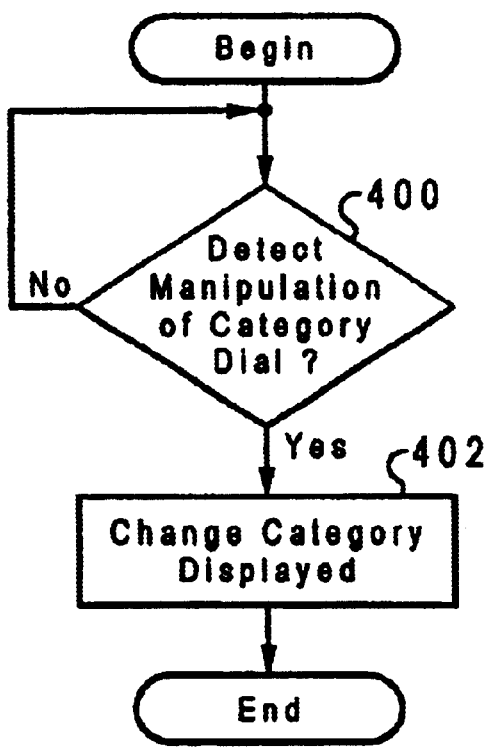
FIG. 4 is a flowchart of a process for displaying categories or channels in accordance with a preferred embodiment of the present invention.

Turning now to FIG. 4, a flowchart of a process for displaying categories or channels is depicted in accordance with a preferred embodiment of the present invention. The process begins by determining whether manipulation of "Channel/Category Dial" has been detected (step 400). If manipulation of this dial is not detected, the process returns to step 400. When manipulation of this dial is detected, the category displayed in output panel 102 is changed (step 402). The category displayed depends on how much the dial has been manipulated.

Figure 5:
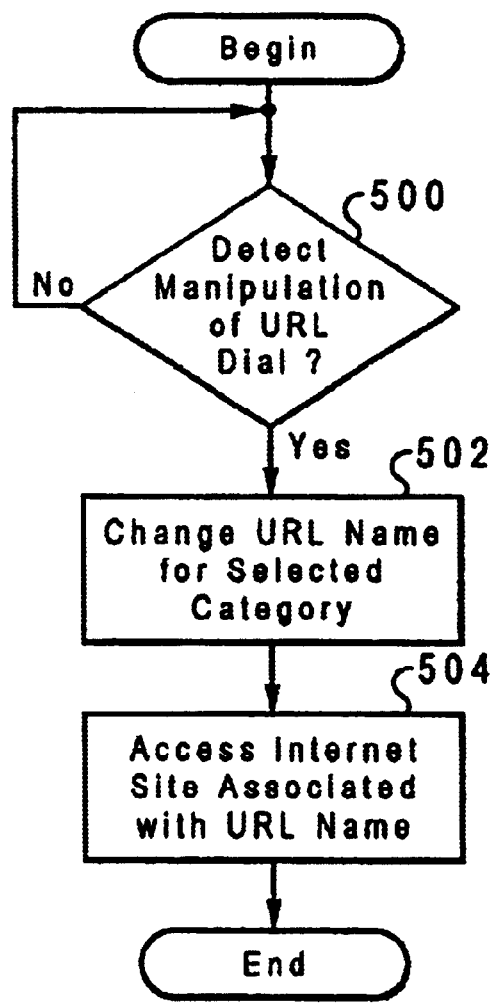
FIG. 5 is a flowchart for a process for selecting universal resource locators in accordance with a preferred embodiment of the present invention.

With reference now to FIG. 5, a flowchart for a process for selecting universal resource locators is depicted in accordance with a preferred embodiment of the present invention. The process begins by determining whether manipulation of the "URL Dial" has occurred (step 500). If manipulation of the dial is not detected, the process returns to step 500. Otherwise, the URL name for the selected category displayed in output panel 102 is changed in output panel 106 (step 502). Thereafter, the process accesses the internet site associated with the URL name (step 504).

Figure 6:
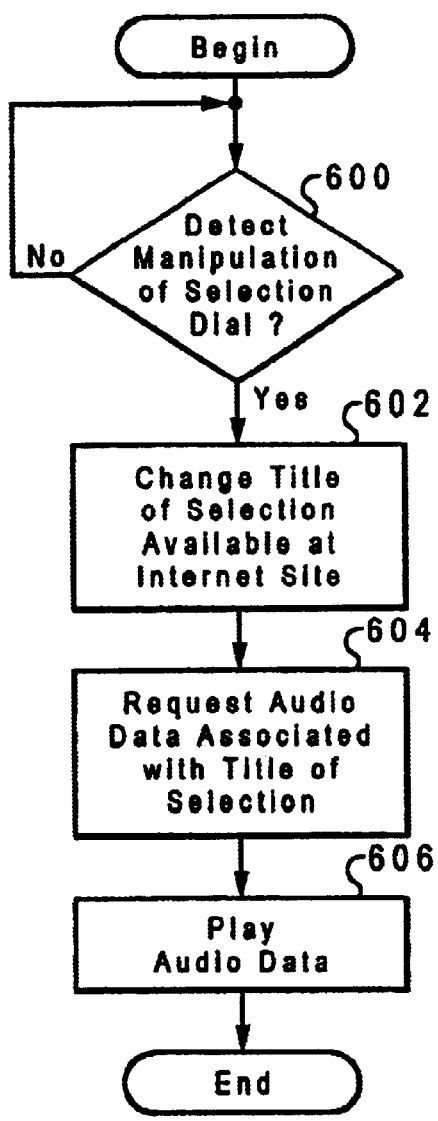
FIG. 6 is a flowchart of a process for choosing a selection in accordance with a preferred embodiment of the present invention.

Turning now to FIG. 6, a flowchart of a process for choosing a selection in accordance with a preferred embodiment of the present invention. The process begins by determining whether the "Selection Dial" has been manipulated (step 600). The process returns to step 600 until manipulation of the "Selection Dial" is detected. At that time, the title of the selection available at the internet site is changed (step 602). By manipulating the "Selection Dial", a user can see all of the audio selections available at a particular internet site. The process then requests audio data associated with the title of the selection displayed in output panel 110 from the internet site (step 604). Thereafter, the process then plays the audio data associated with the title of the selection (step 606). Depending on the implementation, the audio data may be played as it is received from the internet site or the audio data may be played after the entire selection has been received from the internet site.

Figure 7:
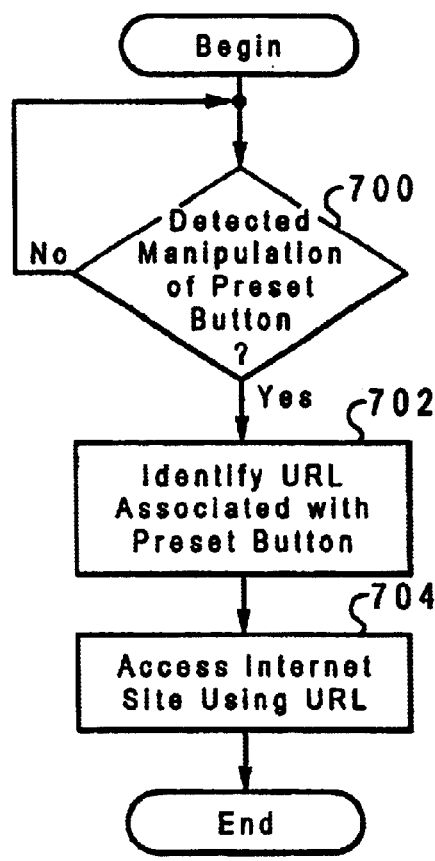
FIG. 7 is a flowchart of a process for accessing internet sites in accordance with a preferred embodiment of the present invention.

Turning now to FIG. 7, a flowchart of a process for accessing internet sites is depicted in accordance with a preferred embodiment of the present invention. The process begins by determining whether manipulation of a pre-set button, such as the "Preset" buttons in FIG. 1, has occurred (step 700). The process returns to step 700 as long as manipulation of the "Preset" button is not detected. Upon detecting manipulation of the "Preset" button, the process then identifies the URL associated with the "Preset" button (step 702). The URLs associated with the "Preset" buttons may be stored within a storage device in the internet radio, such as, for example, small writable permanent storage 214 or large permanent storage 216. Thereafter, the internet site identified by the URL is accessed (step 704). In this manner, a user may preset a number of different internet sites that may be quickly accessed through manipulation of a "Preset" button.

Figure 8:
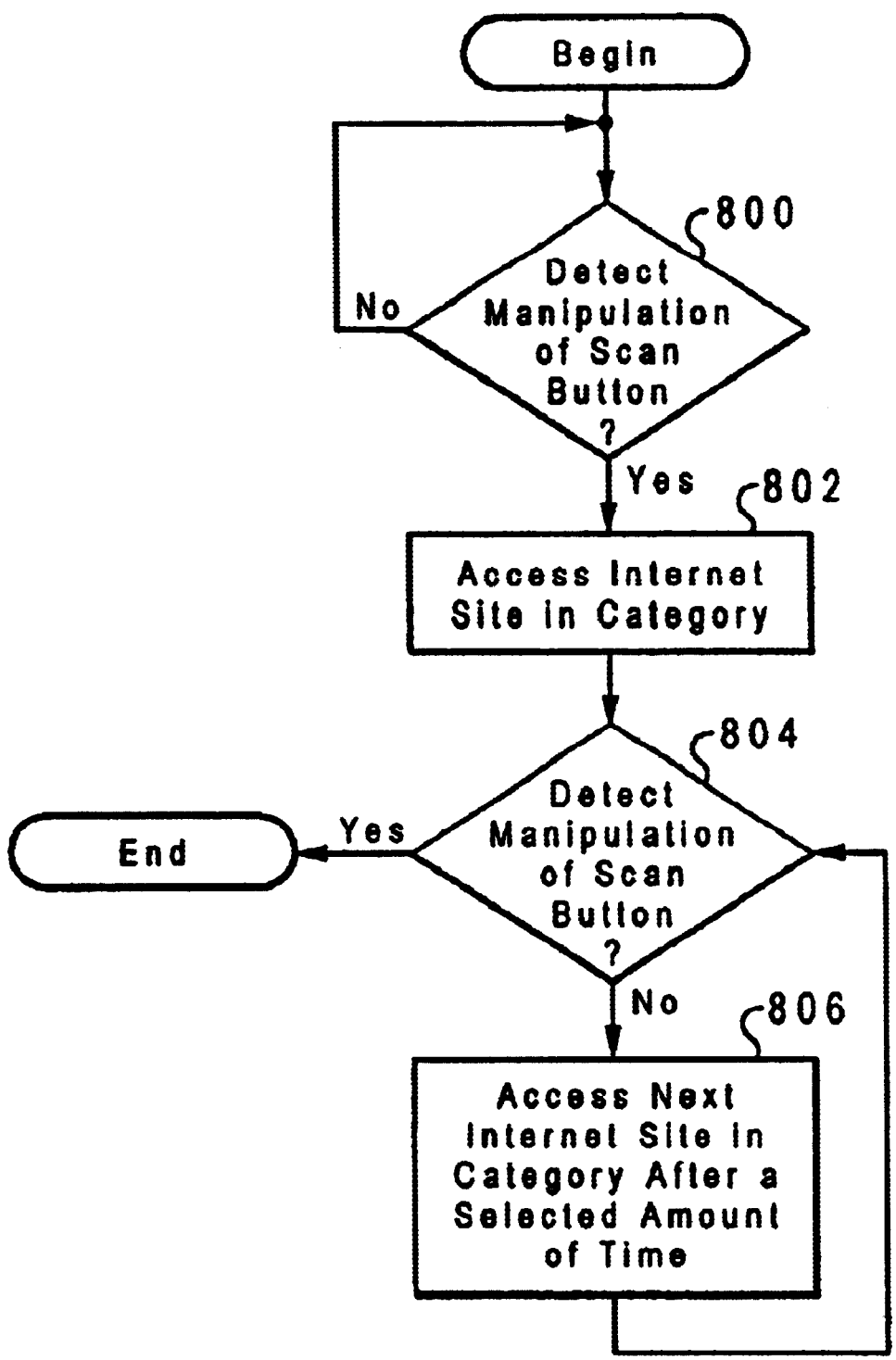
FIG. 8 is a flowchart of a process for scanning internet sites in accordance with a preferred embodiment of the present invention.

Turning now to FIG. 8, a flowchart of a process for scanning internet sites is depicted in accordance with a preferred embodiment of the present invention. This process is employed in the internet radio to scan internet sites associated with URLs in a particular category or channel. The process begins by determining manipulation of the "Scan" button has occurred (step 800). Upon detecting manipulation of the "Scan" button, the process then accesses an internet site in the current category or channel (step 802). Thereafter, the process determines whether the "Scan" button has been manipulated (step 804). If the "Scan" button has not been manipulated, the process then accesses the next internet site in a category after a selected amount of time (step 806) with the process then returning to step 804. Upon detecting manipulation of the "Scan" button, the process then terminates.

Turning now to FIG. 9, a flowchart of a process for accessing internet sites is depicted in accordance with a preferred embodiment of the present invention. The process begins by determining whether manipulation of the "Seek" button (step 900). The process returns to step 900 until manipulation of the "Seek" button occurs. Upon determining that the "Seek" button has been manipulated, the process then accesses the next internet site within the current category or channel selected in the internet radio (step 902) with the process terminating thereafter.

With reference now to FIG. 10, a flowchart of a process for choosing selections in an internet site is depicted in accordance with a preferred embodiment of the present invention. The process begins by determining whether the "Next" button has been manipulated (step 1000). If the "Next" button has not been manipulated, the process then returns to step 1000. Upon detecting manipulation of the "Next" button, the process then retrieves the next selection at the internet site (step 1002).

Figure 11:
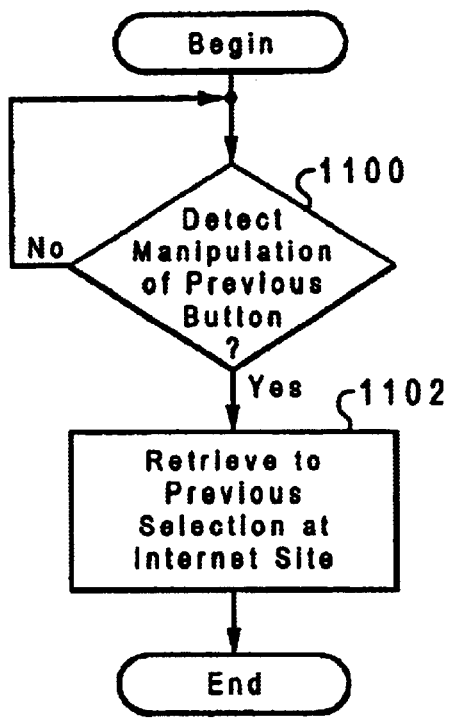
FIG. 11 is a flowchart of a process for choosing selections in an internet site in accordance with a preferred embodiment of the present invention.

Turning now to FIG. 11, a flowchart of a process for choosing selections in an internet site is depicted in accordance with a preferred embodiment of the present invention. The process begins by determining whether the "Previous" button has been manipulated (step 1100). If the "Previous" button has not been manipulated, the process then returns to step 1100. Upon detecting manipulation of the "Previous" button, the process then retrieves the next selection at the internet site (step 1102).

Figure 12:
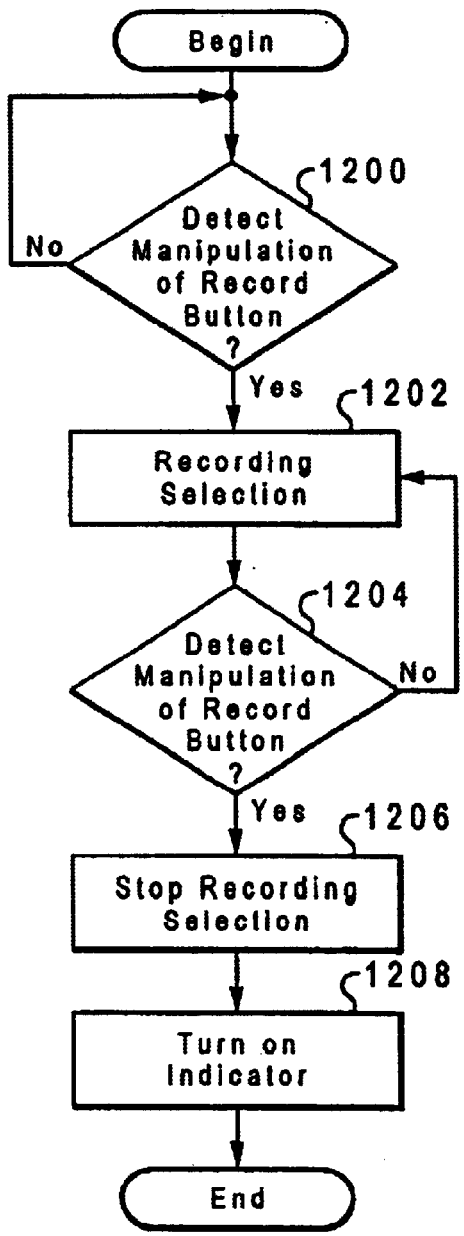
FIG. 12 is a flowchart of a process for recording a selection in accordance with a preferred embodiment of the present invention.

With reference next to FIG. 12, a flowchart of a process for recording a selection is depicted in accordance with a preferred embodiment of the present invention. The process begins by determining whether manipulation of the "Record" button has occurred (step 1200). The process returns to step 1200 until the process detects that the "Record" button has been manipulated. Upon detecting manipulation of the "Record" button, the process then records the selection that is currently being played by the internet radio (step 1202). The audio data recorded for the selection is stored in a storage device, such as, for example, large permanent storage 216 in FIG. 2. The process then determines whether the "Record" button has been manipulated (step 1204). If the "Record" button has been manipulated, the process then stops recording the selection (step 1206). Thereafter, the process then turns on an indicator, such as indicator 146 in FIG. 1, to indicate that recorded items exist with the process terminating thereafter (step 1208). If the "Record" button has not been manipulated, the process returns to step 1202 to continue to record the selection.

Figure 13:
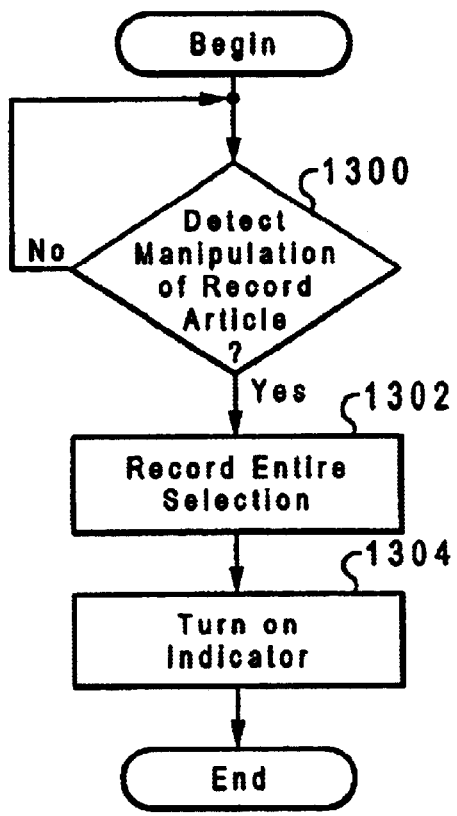
FIG. 13 is a flowchart of a process for recording a selection in accordance with a preferred embodiment of the present invention.

With reference now to FIG. 13, a flowchart of a process for recording a selection is depicted in accordance with a preferred embodiment of the present invention. The process begins by determining whether manipulation of the "Record Article" button on the internet radio has occurred (step 1300). The process returns to step 1300 until manipulation of this button is detected. Upon detecting manipulation of the "Record Article" button, the process records the entire selection (step 1302). Thereafter, the process then turns on an indicator, such as indicator 146 in FIG. 1, to indicate that recorded items exist with the process terminating thereafter. The selection is stored in a storage device, such as, for example, large permanent storage 216 in FIG. 2.

Figure 14:
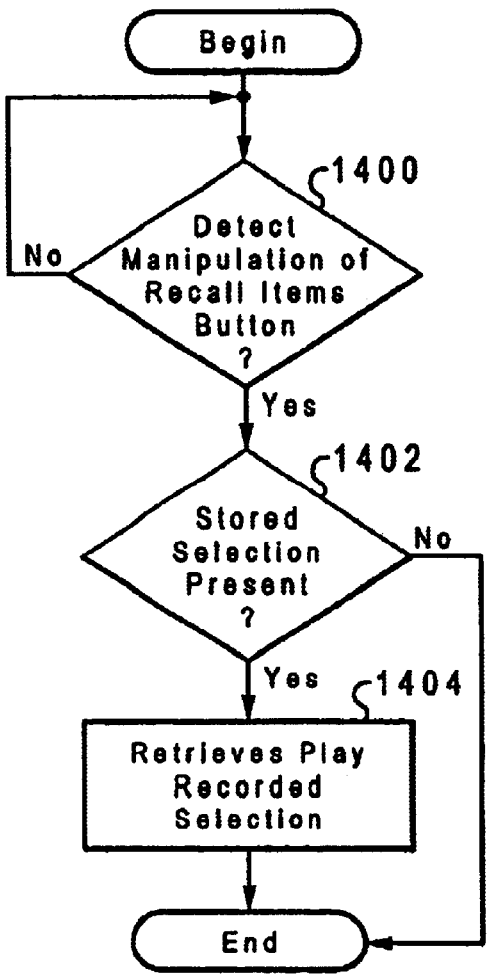
FIG. 14 is a flowchart for a process for playing recorded selection in accordance with a preferred embodiment of the present invention.

Turning now to FIG. 14, a flowchart for a process for playing recorded selection is depicted in accordance with a preferred embodiment of the present invention. The process begins by determining whether the "Recall Items" button has been manipulated (step 1400). Upon detecting manipulation of this button, the process then determines whether a stored selection is present (step 1402). If a stored selection is not present, the process terminates. Otherwise, the process retrieves the recorded selection from the storage device and plays it to the user (step 1404) with the process terminating thereafter.

Figure 15:
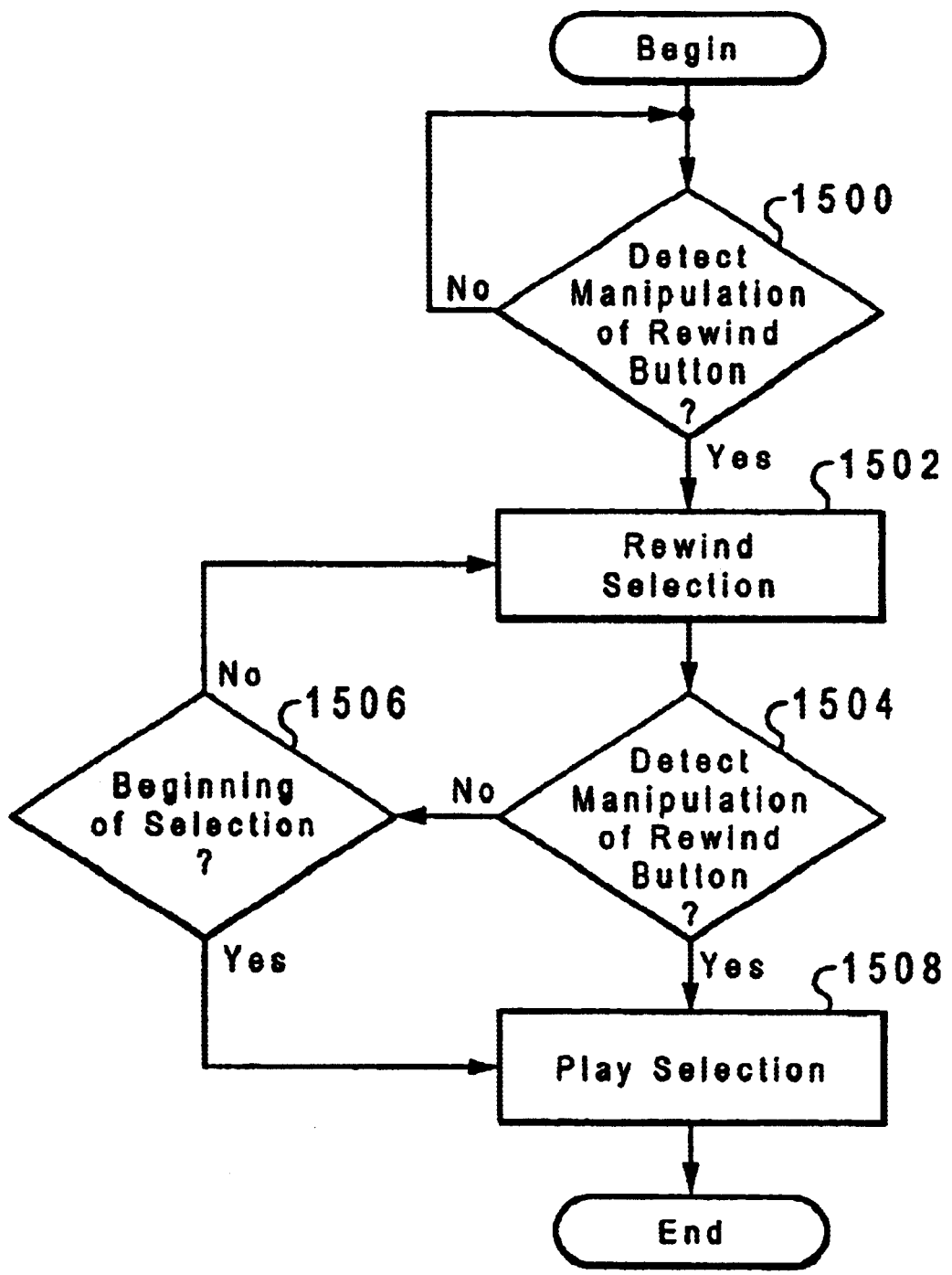
FIG. 15 is a flowchart of a process for rewinding a selection in accordance with a preferred embodiment of the present invention.

Turning now to FIG. 15, a flowchart of a process for rewinding a selection is depicted in accordance with a preferred embodiment of the present invention. The process begins by determining the "Rewind" button has been manipulated (step 1500). The process returns to step 1500 until manipulation of the "Rewind" button is detected. Upon detecting a manipulation of the "Rewind" button, the process begins by rewinding the selection (step 1502). The process then determines whether the "Rewind" button has been manipulated (step 1504). Manipulation of the "Rewind" button may take the form of pressing the "Rewind" button a second time or releasing the "Rewind" button. If the "Rewind" button has not been manipulated, the process then determines whether the beginning of the selection has been reached (step 1506). If the beginning of the selection has not been reached, the process returns to step 1502 with rewinding of the selection continuing to occur. Otherwise, the process proceeds to play the selection (step 1506) with the process terminating thereafter. With reference again to step 1504, if the "Rewind" button has been manipulated, the process also proceeds to step 1506 to play the selection. In this case, however, the selection plays from the point at which the "Rewind" button ceased rather than from the beginning of the selection.

Figure 16:
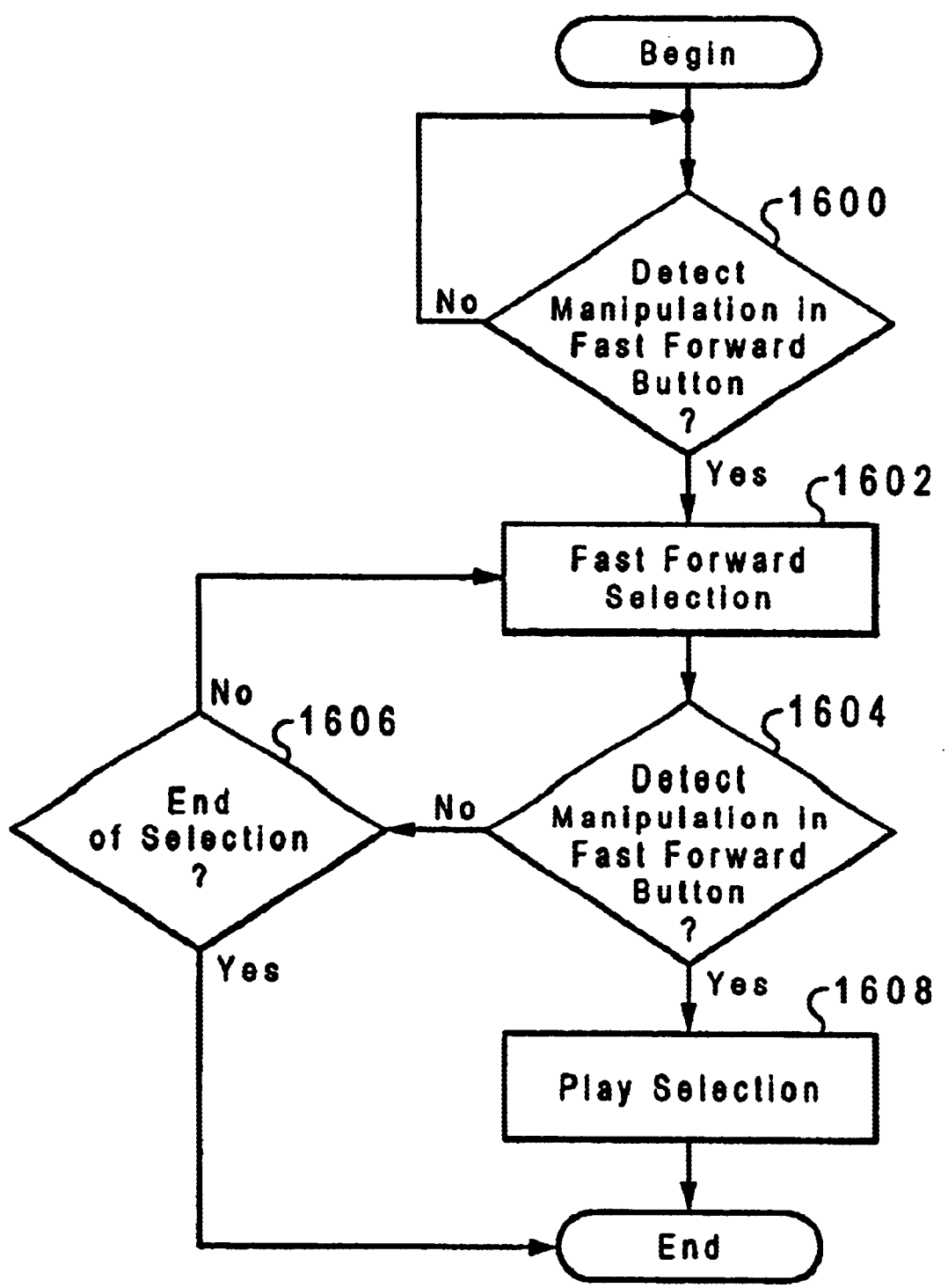
FIG. 16 is a flowchart of a process for fast forwarding a selection in accordance with a preferred embodiment of the present invention.

With reference now to FIG. 16, a flowchart of a process for fast forwarding a selection is depicted in accordance with a preferred embodiment of the present invention. The process begins by determining the "Fast Forward" button has been manipulated (step 1600). The process returns to step 1600 until manipulation of the "Fast Forward" button is detected. Upon detecting a manipulation of the "Fast Forward" button, the process begins by fast forwarding the selection (step 1602). The process then determines whether the "Fast Forward" button has been manipulated (step 1604). Manipulation of the "Fast Forward" button may take the form of pressing the "Fast Forward" button a second time or releasing the "Fast Forward" button. If the "Fast Forward" button has not been manipulated, the process then determines whether the end of the selection has been reached (step 1606). If the end of the selection has been reached, the process terminates. With reference again to step 1604, if the "Fast Forward" button has been manipulated, the process proceeds to step 1606 to play the selection (step 1608). In this case, however, the selection plays from the point at which the "Fast Forward" button ceased rather than from the end of the selection.

Figure 17:
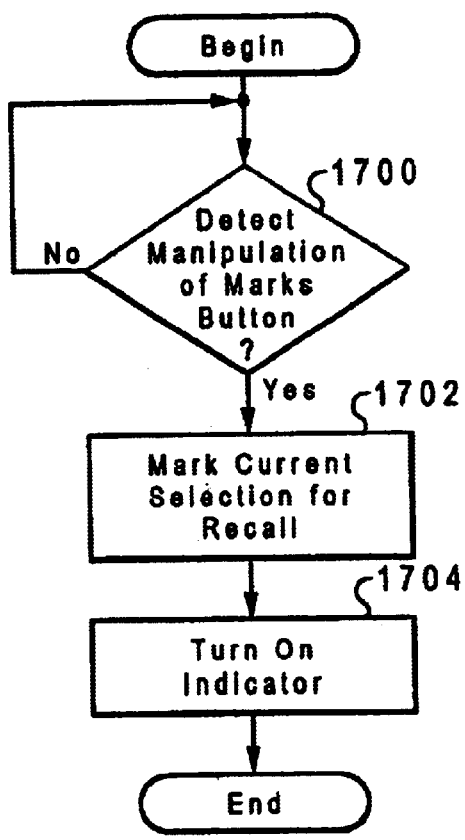
FIG. 17 is a flowchart of a process for marking a current selection in accordance with a preferred embodiment of the present invention.

With reference now to FIG. 17, a flowchart of a process for marking a current selection is depicted in accordance with a preferred embodiment of the present invention. The process begins by determining the "Mark" button has been manipulated (step 1700). The process returns to step 1700 until manipulation of the "Mark" button is detected. Upon detecting a manipulation of the "Mark" button, the process begins by marking the current selection (step 1702). Thereafter, the process then turns on an indicator to indicate that a selection has been marked and may be recalled by a user (step 1704) with the process terminating thereafter. Such an indicator may be indicator 114 in FIG. 1.

Figure 18:
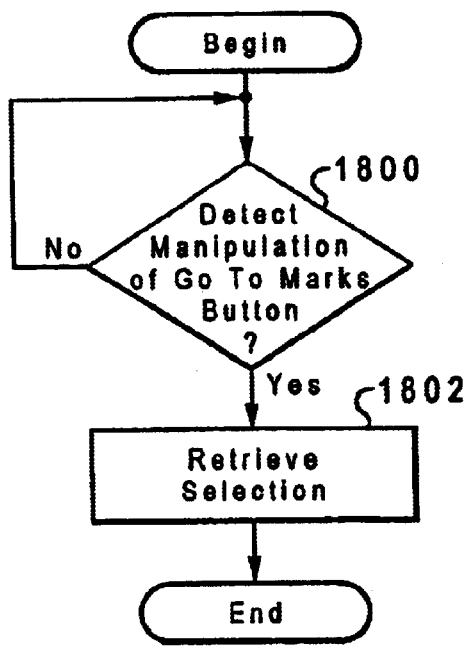
FIG. 18 is a flowchart of a process for retrieving selections in accordance with a preferred embodiment of the present invention.

With reference now to FIG. 18, a flowchart of a process for retrieving selections is depicted in accordance with a preferred embodiment of the present invention. The process begins by determining whether the "Go To Marks" button has been manipulated (step 1800). If the "Go To Marks" button has not been manipulated, the process then returns to step 1800. If the "Go To Marks" button has been manipulated, the process then retrieves the selection previously marked by the user (step 1802) with the process terminating thereafter.

Figure 19:
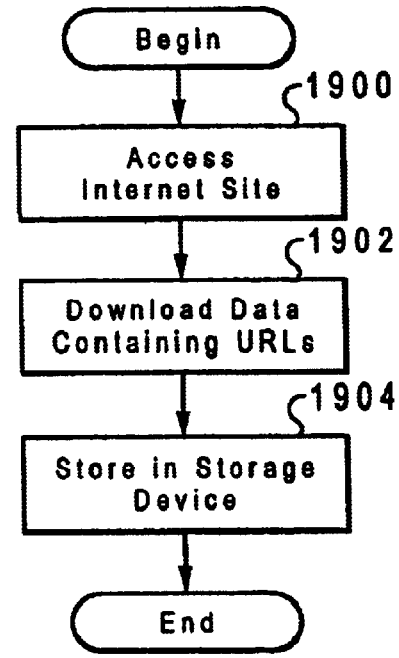
FIG. 19 is a flowchart of a process for identifying channels, categories, and selections in accordance with a preferred embodiment of the present invention.

Turning now to FIG. 19, a flowchart of a process for identifying channels, categories, and selections is depicted in accordance with a preferred embodiment of the present invention. The process begins by accessing an internet site that contains identifications of internet sites and selections at these internet sites that contain audio data for presentation of the user (step 1900). The process then downloads data containing URLs for the internet sites and selections (step 1902). This information is then stored in a storage device with an internet radio, such as, for example, large permanent storage 216 in FIG. 2.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A radio for receiving and playing audio data originating from an internet comprising:
   a plurality of physical controls suitable for manipulation by human digits, wherein at least one physical control of the plurality of physical controls is a physical radio-like control modeled after a traditional AM/FM radio control and dedicated to a particular internet function;
   a communications unit used to provide the radio a communications link to the internet;

an audio unit; and a processor, wherein the processor is electrically connected to the plurality of controls, the communications unit, and the audio unit and wherein the processor includes first instruction means for establishing the communications link to the internet using the communications unit, second instruction means for accessing an internet site containing audio data in response to a manipulation or a first control within the plurality of controls, and third instruction means for playing the audio data through the audio unit, wherein the first control is a uniform resource locator control and wherein the internet site accessed using the second instruction means corresponds to a uniform resource locator which is selected from a plurality of preselected uniform resource locators in response to the manipulation of the first control.

2. The radio of claim 1, wherein the plurality of controls includes a channel/category control.

3. The radio of claim 1, wherein the radio further comprises a display used to display an identification of the internet site accessed by the radio.

4. A radio for receiving and playing audio data originating from an internet comprising:

a plurality of physical controls suitable for manipulation by human digits;

a communications unit used to provide the radio a communications link to the internet;

an audio unit; and a processor, wherein the processor is electrically connected to the plurality of controls, the communications unit, and the audio unit and wherein the processor includes first instruction means for establishing the communications link to the internet using the communications unit, second instruction means for accessing an internet site containing audio data in response to a manipulation or a first control within the plurality of controls, and third instruction means for playing the audio data through the audio unit, wherein the first control is a uniform resource locator control and wherein the internet site accessed using the second instruction means corresponds to a uniform resource locator which is selected from a plurality of preselected uniform resource locators in response to the manipulation of the first control, wherein the uniform resource locator control is a dial.

5. A radio for receiving and playing audio data originating from an internet comprising:

a plurality of physical controls suitable for manipulation by human digits, wherein at least one physical control of the plurality of physical controls is a physical radio-like control modeled after a traditional AM/FM radio control and dedicated to a particular internet radio function;

a communications unit used to provide the radio a communications link to the internet;

an audio unit;

at processor, wherein the processor is electrically connected to the plurality of controls, the communications unit, and the audio unit and wherein the processor includes first instruction means for establishing the communications link to the internet using the communications unit, second instruction means for accessing an internet site containing audio data in response to a manipulation of a first control within the plurality of controls, and third instruction means for playing the audio data through the audio unit; and a housing, wherein the plurality of controls, the audio unit, and the processor are connected to the housing, wherein the radio includes a display used to display a plurality of selections, wherein each selection within the plurality of selections represents a uniform resource locator for an internet site containing audio data, wherein the first control is used to select a selection within the plurality of selections, and wherein the processor includes fourth instruction means for accessing the selection selected using the first control.

6. A radio for receiving and playing audio data originating from an internet comprising:

a plurality of physical controls suitable for manipulation of human digits, wherein at least one physical control of the plurality of physical controls is a mechanical radio-like control modeled after a traditional AM/FM radio control and dedicated to a particular internet radio function;

a communications unit used to provide the radio a communications link to the internet;

an audio unit;

a processor, wherein the processor is electrically connected to the plurality of controls, the communications unit, and the audio unit and wherein the processor includes first instruction means for establishing the communications link to the internet using the communications unit, second instruction means for accessing an internet site containing audio data in response to a manipulation of a first control within the plurality of controls, and third instruction means for playing the audio data through the audio unit; and a housing, wherein the plurality of controls, the audio unit, and the processor are connected to the housing, wherein the plurality of controls includes a number of controls associated with a number of uniform resource locators and fourth instruction means for accessing a particular uniform resource locator within the number of uniform resource locators in response to manipulation of a particular control, within the number of controls, associated with the particular uniform resource locator.

7. The radio of claim 6, wherein the plurality of controls includes a scan button used to scan the number of uniform resource locators and wherein the processor includes fifth instruction means for successively accessing each internet site identified by each uniform resource locator within number of uniform resource locators in response to a manipulation of the scan button.

8. The radio of claim 1, wherein the plurality of controls includes a record button and wherein the processor includes fourth instruction means for recording audio data from an internet site in response to a manipulation of the record button, wherein the recorded audio data forms a selection.

9. The radio of claim 8, wherein the plurality of controls includes a rewind button and wherein the processor includes fifth instruction means for replaying a portion of the audio data from an internet site in response to a manipulation of the rewind button.

10. The radio of claim 8, wherein the plurality of buttons includes a recall button and wherein the processor includes fifth instruction means for recalling a selection in response to a manipulation of the recall button.

11. The radio of claim 10, wherein a plurality of selections have been recorded and wherein the fifth instruction means cycles through the plurality of selections in response to manipulation of the recall button.

12. The radio of claim 8, wherein the plurality of buttons includes a mark button used to mark the selection to form a marked selection for later replay and wherein the processor includes fifth instruction means for identifying the selection as a marked selection in response to a manipulation of the mark button.

13. The radio of claim 12, wherein the plurality of buttons includes a go to mark button and wherein the processor includes sixth instruction means for playing a marked selection in response to manipulation of the go to mark button.

14. An internet radio comprising:
a display panel;
a mechanical control suitable for manipulation by human digits, the mechanical control being modeled after a traditional AM/FM radio control;
a communications unit adapted to establish a communications link to an internet;
display means for displaying at least one of a plurality of audio selections on the display panel, wherein the plurality of audio selections identify audio data located in the internet;
indication means for indicating a selection of an audio selection within the plurality of audio selections;
access means for retrieving the audio data, from the internet, associated with the audio selection indicated by the indication means;
presentation means for playing the retrieved audio data; and
alteration means, responsive to manipulation of the mechanical control, for altering the indication means to indicating a selection of another audio selection.

15. The internet radio of claim 14, wherein the playing of the retrieved audio data occurs at a volume and further comprising:
a second mechanical control suitable for manipulation by human digits; and
volume control means for altering the volume in response to manipulation of the second mechanical control.

16. The internet radio of claim 14, wherein the retrieved audio data is located at a site identified by a universal resource locator.

17. The internet radio of claim 14 further comprising:
a second mechanical control suitable for manipulation by human digits; and
storage means, responsive to manipulation of the third mechanical control, for storing the retrieved audio data.

18. An internal radio comprising:
a display panel;
a mechanical control suitable for manipulation by human digits;
a communications unit adapted to establish a communications link with to an internet;
display means for displaying at least one of a plurality of audio selections on the display panel, wherein the plurality of audio selections identify audio data located in the internet;
indication means for indicating a selection of an audio selection within the plurality of audio selections;
access means for retrieving the audio data, from the internet, associated with the audio selection indicated by the indication means;
presentation means for playing the retrieved audio data;
alteration means, responsive to manipulation of the mechanical control, for altering the indication means to indicating a selection of another audio selection;
a housing, wherein the display panel, the communications unit, the display means, the indication means, the access means, the presentation means, the alteration means, and the mechanical control suitable for manipulation by human digits are connected to the housing;
a second mechanical control suitable for manipulation by human digits; and
second alteration means, responsive to manipulation of the second mechanical control, for automatically altering the indication of the audio selection, wherein a different audio selection within the plurality of audio selections is indicated each time a preselected period of time occurs.

19. A portable radio for receiving and playing audio data originating from an internet comprising:
a plurality of physical controls suitable for manipulation by human digits, wherein at least one physical control of the plurality of physical controls is a physical radio-like control modeled after a traditional AM/FM radio control and dedicated to a particular internet radio function;
a communications unit used to provide the radio a communications link to the internet;
an audio unit;
a processor, wherein the processor is electrically connected to the plurality of controls, the communications unit, and the audio unit and wherein the processor includes first instruction means for establishing the communications link to the internet using the communications unit, second instruction means for accessing an internet site containing audio data in response to a manipulation of a first control within the plurality of controls, and third instruction means for playing the audio data through the audio unit; and
a portable energy storage unit to supply electrical power for operating the portable radio, wherein the first control is a uniform resource locator control and wherein the internet site accessed by the second instruction means corresponds to a uniform resource locator selected from a plurality of preselected uniform resource locators, in response to the manipulation of the first control.

20. The portable radio of claim 19, wherein the plurality of controls includes a channel/category control.

21. The portable radio of claim 19, wherein the communications link is a wireless communications link.

22. A portable radio for receiving and playing audio data originating from internet comprising:
a plurality of physical controls suitable for manipulation by human digits;
a communications unit used to provide the radio a communications link to the internet;
an audio unit;
a processor, wherein the processor is electrically connected to the plurality of controls, the communications unit, and the audio unit and wherein the processor includes first instruction means for establishing the communications link to the internet using the communications unit, second instruction means, for accessing an internet site containing audio data in response to a manipulation of a first control within the plurality of controls, and third instruction means for playing the audio data through the audio unit; and a portable energy storage unit to supply electrical power for operating the portable radio, wherein the first control is a uniform resource locator control and wherein the internet site accessed by the second instruction means corresponds to a uniform resource locator selected from a plurality of preselected uniform resource locators, in response to the manipulation of the first control, wherein the uniform resource locator control is a dial.

* * * * *

UNITED STATES PATENT AND TRADEMARK OFFICE
CERTIFICATE OF CORRECTION

PATENT NO. : 6,741,869 B1
APPLICATION NO. : 08/989499
DATED : May 25, 2004
INVENTOR(S) : Lehr It is certified that error appears in the above-identified patent and that said Letters Patent is hereby corrected as shown below:

Col. 8, line 65: before "function;" insert --radio--.

Col. 9, line 9: after "manipulation" delete "or" and insert --of--.

Col. 9, line 37: after "manipulation" delete "or" and insert --of--.

Col. 9, line 58: before "processor, wherein" delete "at" and insert --a--.

Col. 10, line 14: before "human digits," delete "of" and insert --by--.

Col. 12, line 48: after "from" insert --an--.

Col. 12, line 59: after "means" delete ",".

Signed and Sealed this

Twentieth Day of March, 2007

JON W. DUDAS
*Director of the United States Patent and Trademark Office*